Jan. 26, 1937.  W. B. LODDER  2,069,040
TEMPERATURE REGULATING VALVE
Filed Oct. 27, 1934  2 Sheets-Sheet 1
Fig. 1.
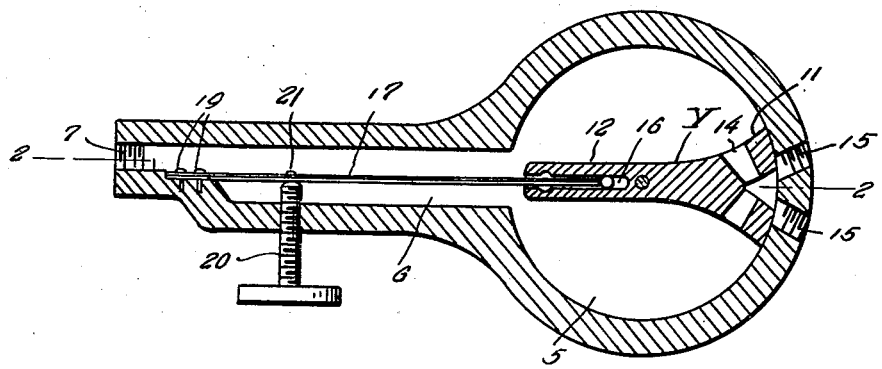
Fig. 2.
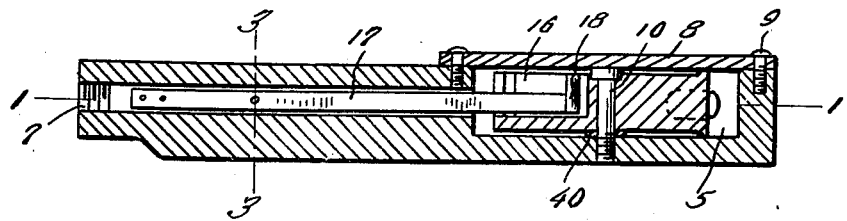
Fig. 4.
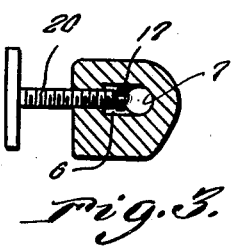
Fig. 3.
Inventor
W. B. Lodder
By Clarence A. O'Brien
Attorney Jan. 26, 1937. W. B. LODDER 2,069,040
TEMPERATURE REGULATING VALVE
Filed Oct. 27, 1934 2 Sheets-Sheet 2
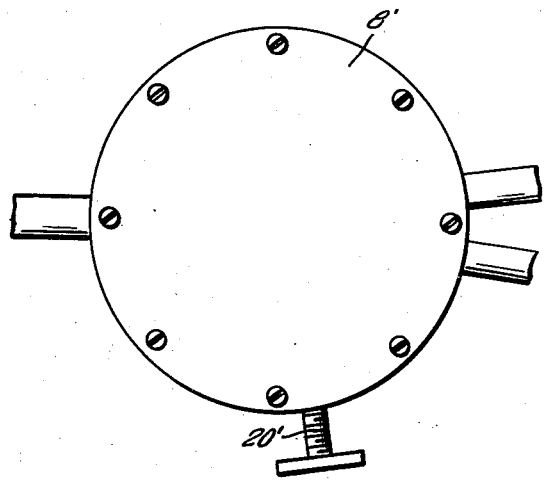
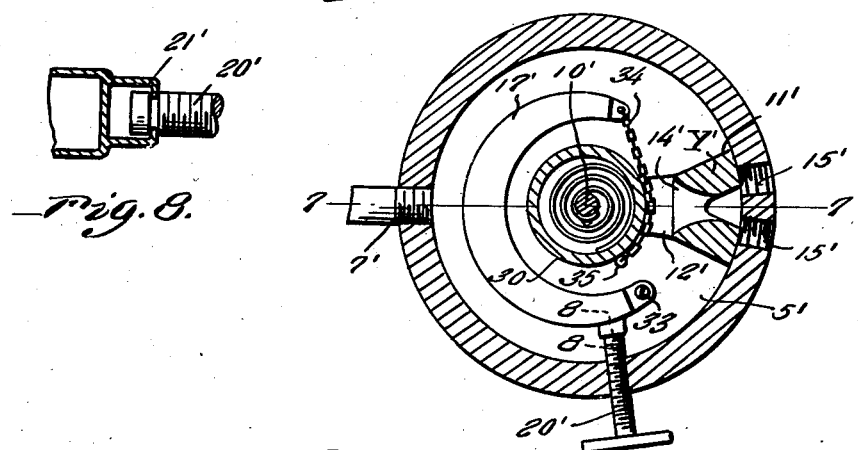
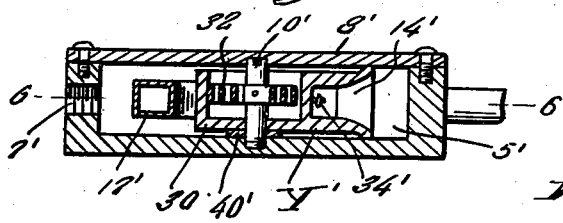
Inventor
W. B. Lodder
By Clarence A. O'Brien
Attorney Patented Jan. 26, 1937

2,069,040

UNITED STATES PATENT OFFICE 2,069,040

TEMPERATURE REGULATING VALVE

William B. Lodder, Syracuse, N. Y.

Application October 27, 1934, Serial No. 750,339

5 Claims. (Cl. 236—12)

The present invention relates to a temperature regulating valve and has for its prime object to provide means whereby hot and cold water may be mixed so that water of the desired temperature may be readily maintained when being used for various purposes where a constant temperature is desired.

Another very important object of the invention resides in the provision of a temperature regulating valve of this nature which is easy to adjust depending upon the temperature desired.

A still further very important object of the invention resides in the provision of a temperature regulating valve of this nature which is comparatively simple in its construction, compact and convenient in its arrangement of parts, not likely to easily become out of order, thoroughly efficient and reliable in use and operation, and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:

Figure 1 is a longitudinal sectional view taken substantially on the line 1—1 of Figure 2.

Figure 2 is a similar section taken at right angles to that shown in Figure 1 substantially on the line 2—2 of Figure 1, Figure 3 is a detail transverse section taken substantially on the line 3—3 of Figure 2, Figure 4 is a perspective view of the heat responsive element or thermostat, Figure 5 is a plan view of another embodiment of the invention, Figure 6 is a sectional view taken substantially on the line 6—6 of Figure 7, Figure 7 is a sectional view taken substantially on the line 7—7 of Figure 6, Figure 8 is a detail section taken substantially on the line 8—8 of Figure 6.

Referring to the drawings in detail and first particularly to the embodiment of the invention shown in Figures 1 to 4 inclusive, it will be seen that I have provided a circular mixing chamber 5 from which radiates outwardly an extension 6 terminating in the internally threaded outlet opening 7. A removable cap 8 is provided for the mixing chamber 5 being held in place by suitable means such as screws 9. A headed pin 10 is threadedly engaged in the center of the chamber and has rockable thereon a Y-shaped gate Y'.

This gate Y' comprises a pair of diverging wings 11—11 merging with stem 12. The wings 11 are provided with openings 14 through which the water may flow. A pair of openings 15—15 are provided in the wall of the chamber in spaced relation to each other and adjacent to each other and opposed to the extension 6 and are adapted to be partially closed by the ends of the wings 11, said ends being slightly more spaced apart and slightly broader than the opening 15. The stem 12 is rockable intermediate its ends on the pin 10. A slot 16 extends inwardly from the extremity of the stem. Numeral 17 denotes an elongated bi-metal heat responsive element or thermostat with the pin 18 on the extremity thereof which is disposed in the slot 16. The other end of this element 17 is fixed in the outer portion of the extension 6 as indicated at 19. A screw 20 is threaded through one side of the extension 6 and has a swivel engagement 21 with an intermediate portion of the element 17 so that this element may be adjusted.

As the hot and cold waters flow through the openings 15 into the chamber they will be mixed and contacted with the element 17 causing the same to bend and rock the gate Y' so as to adjust the wings 11 thereof with respect to the openings 15 so that the proper temperature of the mixture may be had which is flowing through the outlet 7.

Now referring to the other embodiment of the invention disclosed in Figure 5 it will be seen that numeral 5' denotes the mixing chamber, numerals 15', 15' the hot and cold inlet openings, numeral 7' the outlet opening directly from the chamber, and the letter Y' denotes generally the gate. This gate includes the wings 11', 11' cooperating with the openings 15' similar to the first mentioned embodiment. An opening 14' is provided in the crotch of the gate to permit the passage of water. The stem 12' terminates in a cylindrical casing 30 rockable on a pin 10' mounted in a wall of the chamber 5'. In this casing 30 there is a spring 32 having one end fixed to the pin and coiled about the pin and the other end fixed in the casing and is tensioned to normally urge the gate Y' in a clockwise direction with respect to Figure 6.

Numeral 17' denotes a crescent shaped heat responsive element which in the present instance is hollow and adapted to be filled with compressed air or gas. One end of this crescent shaped element is pivotally mounted as at 33 in the chamber 5 and curves about the casing and on the other end thereof there is fixed a chain 34 which extends partially about the casing 30 and is anchored thereon as at 35. A screw 20' is swivelled as at 21' to the element 17' adjacent its pivot 33 and is threaded through the wall of the chamber so that the heat responsive element may be adjusted in accordance with the desired temperature of the water.

As the hot and cold water flows into the mixing chamber and contacts with the heat responsive element the same will change its curvature depending upon the temperature of the mixture and will either pull on the chain 34 so as to rock the gate in one direction or slacken the chain so that the spring will rock the gate in the other direction.

With either of the embodiments a valve or faucet must be used near the outlet for this device only controls the temperature and does not stop the flow of water completely at any time. Use of valves on each inlet pipe would improve the adjustment at installation.

It is thought that the construction, operation, manipulation, adjustability and other features of these two embodiments will now be clearly understood by those skilled in this art without a more detailed description thereof.

The present embodiments of the inventions have been disclosed merely for the purpose of exemplification since in actual practice they attain the features of advantage enumerated as desirable in the statment of the invention and the above description.

It will be apparent that changes in the details of construction, and in the combination and arrangement of parts may be resorted to without departing from the spirit or scope of the inventions as hereinafter claimed or sacrificing any of its advantages.

Gates Y and Y' are spaced from the walls of the respective chambers 5 and 5' by washers 40 and 40' on the pins 10 and 10' which washers bear against the wall of the chamber.

Having thus described the invention, what is claimed as new is:

1. A temperature regulated valve comprising a mixing chamber having a pair of adjacent intake openings and an outlet opening located remotely from the inlet openings, said mixing chamber including an elongated extension opposite the intake openings and having the outlet opening in the extremity of the extension, a substantially Y-shaped gate including a stem and diverging wings swingably mounted in the chamber so that the ends of the wings vary the area of the intake openings and the span of the wings being greater than the space between the openings to provide an auxiliary chamber between the wings of the gate, said gate provided with an opening forming a communication between the auxiliary chamber and the mixing chamber, an elongated heat responsive element having one end anchored in the outer portion of the extension and the other end slidable in a slot provided in the stem of the gate, said slot formed longitudinally of the stem, and a screw threaded through one side of the extension and having a swivel connection with said heat responsive element.

2. A temperature regualted valve comprising a mixing chamber having a pair of adjacent intake openings and a free unimpeded outlet opening located remotedly from the inlet openings, a substantially Y-shaped gate swingably mounted in the mixing chamber, said gate including a stem and wings diverging therefrom so that the free end of the wings vary the area of the intake openings and the span of the wings being greater than the space between the inlet openings thereby forming an auxiliary mixing chamber confined within the gate, said gate formed with a passage communicating with the mixing chamber and the auxiliary mixing chamber, heat responsive means operatively connected with the stem of the gate to rock the gate for regulating the flow through the intake openings, and movable means carried by the mixing chamber and having a connection with heat responsive means for adjusting the latter.

3. A temperature regulated valve comprising a mixing chamber having a pair of adjacent intake openings and a remotely located outlet opening, a substantially Y-shaped gate swingably mounted in the mixing chamber, said gate including a stem and wings diverging therefrom so that the ends of the wings vary the area of the intake openings and the span of the wings being greater than the space between the openings to provide an auxiliary chamber between the wings of the gate, said gate provided with an opening forming a communication between the auxiliary chamber and the mixing chamber, and heat responsive means operatively connected with the stem of the gate to rock the gate for regulating the flow through the intake openings, said heat responsive means comprising a crescent shaped hollow member having one end pivotally mounted in the mixing chamber and the other end thereof operatively connected with the gate so that the gate may be actuated by the thermostatic action of the member.

4. A temperature regulated valve comprising a mixing chamber having a pair of adjacent intake openings and a remotely located outlet opening, a substantially Y-shaped gate swingably mounted in the mixing chamber, said gate including a stem and wings diverging therefrom so that the ends of the wings vary the area of the intake openings and the span of the wings being greater than the space between the openings to provide an auxiliary chamber between the wings of the gate, said gate provided with an opening forming a communication between the auxiliary chamber and the mixing chamber, and heat responsive means operatively connected with the stem of the gate to rock the gate for regulating the flow through the intake openings, said heat responsive means comprising a crescent shaped hollow member having one end pivotally mounted in the mixing chamber, the stem of the Y-shaped gate having a cylindrical casing formed thereon and a pin in the chamber for rockably mounting this casing, a coil spring having one end fixed to the pin and the other end fixed to the casing, and a chain having one end fixed to the exterior of the casing and the other end fixed to the other end of the heat responsive means.

5. A temperature regulated valve comprising a mixing chamber having a pair of adjacent intake openings and a remotely located outlet opening, a substantially Y-shaped gate swingably mounted in the mixing chamber, said gate including a stem and wings diverging therefrom so that the ends of the wings vary the area of the intake openings and the span of the wings being greater than the space between the openings to provide an auxiliary chamber between the wings of the gate, said gate provided with an opening forming a communication between the auxiliary chamber and the mixing chamber, and heat responsive means operatively connected with the stem of the gate to rock the gate for regulating the flow through the intake openings, said heat responsive means comprising a crescent shaped hollow member having one end pivotally mounted in the mixing chamber, the stem of the Y-shaped gate having a cylindrical casing formed thereon and a pin in the chamber for rockably mounting this casing, a coil spring having one end fixed to the pin and the other end fixed to the casing, and a chain having one end fixed to the exterior of the casing and the other end fixed to the other end of the heat responsive means, a screw mounted through an opening in the side of the chamber and having a swivel connection with the crescent shaped member adjacent its pivoted end.

WILLIAM B. LODDER.